US006464310B1

(12) United States Patent
Burns et al.

(10) Patent No.: US 6,464,310 B1
(45) Date of Patent: Oct. 15, 2002

(54) GRADUATED ROUTING PARTITION

(75) Inventors: Jennifer D. Burns, Ft. Worth; Carrie L. Gordon, Saginaw; Monique L. Cote, Ft. Worth, all of TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/662,515

(22) Filed: Sep. 14, 2000

(51) Int. Cl.[7] .......................... A47B 97/00; E04C 2/52
(52) U.S. Cl. ..................... 312/223.6; 52/220.7
(58) Field of Search ............. 52/220.1, 220.2, 52/220.7, 241; 312/223.6, 223.1; 211/26

(56) References Cited

U.S. PATENT DOCUMENTS 5,277,006 A * 1/1994 Ruster .................... 52/220.7
6,102,214 A * 8/2000 Mendoza ................. 211/26
6,256,950 B1 * 7/2001 Laukhuf et al. ......... 52/220.7 X

* cited by examiner

*Primary Examiner*—James O. Hansen
(74) *Attorney, Agent, or Firm*—Christopher C. Dremann (57) ABSTRACT

A partition is provided for routing fiber optic communications cables into a high-density cross-connect cabinet. The partition provides improved access to the communications cables and the cable connections. The partition further permits a plurality of fiber optic communications cables entering the cross-connect cabinet at the same location to be strain-relieved at different levels of the cabinet. In a preferred embodiment, the partition includes a baseplate and a plurality of routing panels depending outwardly from the base plate at longitudinally spaced apart and laterally spaced apart locations. From the uppermost routing panel to the lower most routing panel, each routing panel is preferably located at an increased distance from the forward edge of the base plate. Each routing panel includes an arcuate portion for transitioning the fiber optic communication cables into the cross-connect cabinet. The routing panel further includes a plurality of strain relief mounting points for mounting at least one strain relief member on the outer surface of the routing panel. In a preferred embodiment, the strain relief member includes a base for receiving the fiber optic communications cable therein and a cover hingedly attached to the base for movement between an open position and a closed position.

21 Claims, 4 Drawing Sheets

GRADUATED ROUTING PARTITION

CROSS REFERENCE TO RELATED APPLICATIONS (none)

FIELD OF THE INVENTION

The present invention relates generally to communications hardware and equipment. More particularly, the invention is a partition for routing a plurality of fiber optic communications cables into a high-density cross-connect cabinet wherein the partition provides improved access and incremental strain relief.

BACKGROUND OF THE INVENTION

With the need for increased communications capacity, greater demands are being placed on the hardware and equipment utilized to route communications cables. The need for increased capacity necessarily requires that additional communications cables be routed into high-density cross-connect cabinets. At the same time, there is the ever present design requirement to minimize the space occupied by such cabinets while maintaining the same, or an improved, degree of access to the communications cables and the cable connections. These conflicting objectives, namely increasing the communications capacity of the cross-connect cabinet while minimizing the space occupied by the cabinet, presents a difficult challenge to those tasked with routing an ever greater number of communications cables with the same, or improved access to the communications cables and the cable connections.

In addition, certain communications applications require that multiple fiber optic communications cables entering the cross-connect cabinet at the same location be strain-relieved at different elevations, referred to herein as "levels," of the cabinet before being routed to the proper connector on the appropriate patch panel. Meeting this requirement while at the same time maintaining the minimum bend radius of the fiber optic cable creates significant routing problems for conventional cross-connect cabinets. In particular, the amount of cable overlap makes it exceedingly difficult to locate and access a cable previously routed to a different level of the cabinet. As a result, considerable manpower, time, and effort is expended to trace (i.e., locate), disconnect, and re-route a communications cable that is to be connected to another connector on the same, or a different, level of the cross-connect cabinet.

Thus, it is apparent that a particular need exists for a partition that permits a plurality of communications cables to be routed to different levels of a cross-connect cabinet while simultaneously providing improved access to the communications cables and the cable connections. It is further apparent that a particular need exists for a partition that permits multiple communications cables entering a cross-connect cabinet at the same location to be strain relieved at different levels of the cabinet before the cables are routed to the proper connector on the appropriate patch panel. Additional features and advantages of the invention are set forth in the following description, or are apparent from the following description, or will be learned by practice of the invention. These objectives and other advantages of the invention are realized by the invention particularly pointed out in the written description and claims hereof, as well as the accompanying drawings.

SUMMARY OF THE INVENTION

To achieve these and other advantages, and in accordance with the purpose of the invention as embodied and broadly described herein, the present invention is directed to a partition for routing a plurality of cables into an electrical cabinet. In a preferred embodiment, the partition includes a generally planar base plate and at least two routing panels depending outwardly from the base plate at longitudinally spaced apart and laterally spaced apart locations. The base plate has a forward edge, a rearward edge, a first dimension defining a longitudinal direction, and a second dimension perpendicular to the first dimension and defining a lateral direction. Preferably, the rearward edge of the base plate includes a series of stepped portions longitudinally spaced apart at increased lateral distances from the forward edge of the base plate. The base plate may further include a lower edge and a laterally extending first flange adjacent the lower edge for securing the partition to the electrical cabinet. Likewise, the base plate may further include a longitudinally extending second flange adjacent the forward edge for securing the partition to the electrical cabinet Each of the routing panels includes an arcuate portion. for receiving at least one of the plurality of cables thereon. The arcuate portion has a radius greater than the minimum bend radius of the cable to prevent damage to the cable. In another preferred embodiment, as will be described, each routing panel is provided with at least one strain relief mounting point. The partition may further include at least one generally cylindrical cable spool for receiving a predetermined amount of slack of at least one of the plurality of cables thereon. The cable spool depends outwardly from the base plate and has a radius greater than the minimum bend radius of the cable to prevent damage to the cable. The cable spool includes a retaining flange spaced apart from the base plate and having a radius greater than the radius of the cable spool to securely retain the predetermined amount of slack on the cable spool.

In a particular aspect of the invention, each of the plurality of cables is a fiber optic communications cable and the electrical cabinet is a high-density cross-connect cabinet for connecting the fiber optic cables to a patch panel. At least one of the routing panels includes means for strain relieving at least one of the plurality of cables. The means for strain relieving may be conventional cable ties or Velcro® straps. However, the means for strain relieving is preferably a strain relief member mounted on the outer surface of the routing panel for receiving at least one of the fiber optic cables therein. The strain relief member includes a base and a cover hingedly attached to the base for movement between an open position and a closed position. Accordingly, a plurality of communications cables entering the cross-connect cabinet at the same location may be strain-relieved at different levels of the cabinet.

It is to be understood that both the foregoing general description and the following detailed description are merely exemplary and are intended to provide further explanation of the invention as claimed. The accompanying drawings are included to provide a further understanding of the invention and are incorporated in and constitute a part of this disclosure, illustrate one or several embodiments of the invention, and, together with the written description, serve to better explain and illustrate the principles of the invention.

BRIEF DESCRIPTION OF THE DRAWINGS

One or more preferred embodiments of the invention will be described more fully below and illustrated in the accompanying drawings in which.

DETAILED DESCRIPTION OF THE PREFERRED EMBODIMENTS

Figure 1:
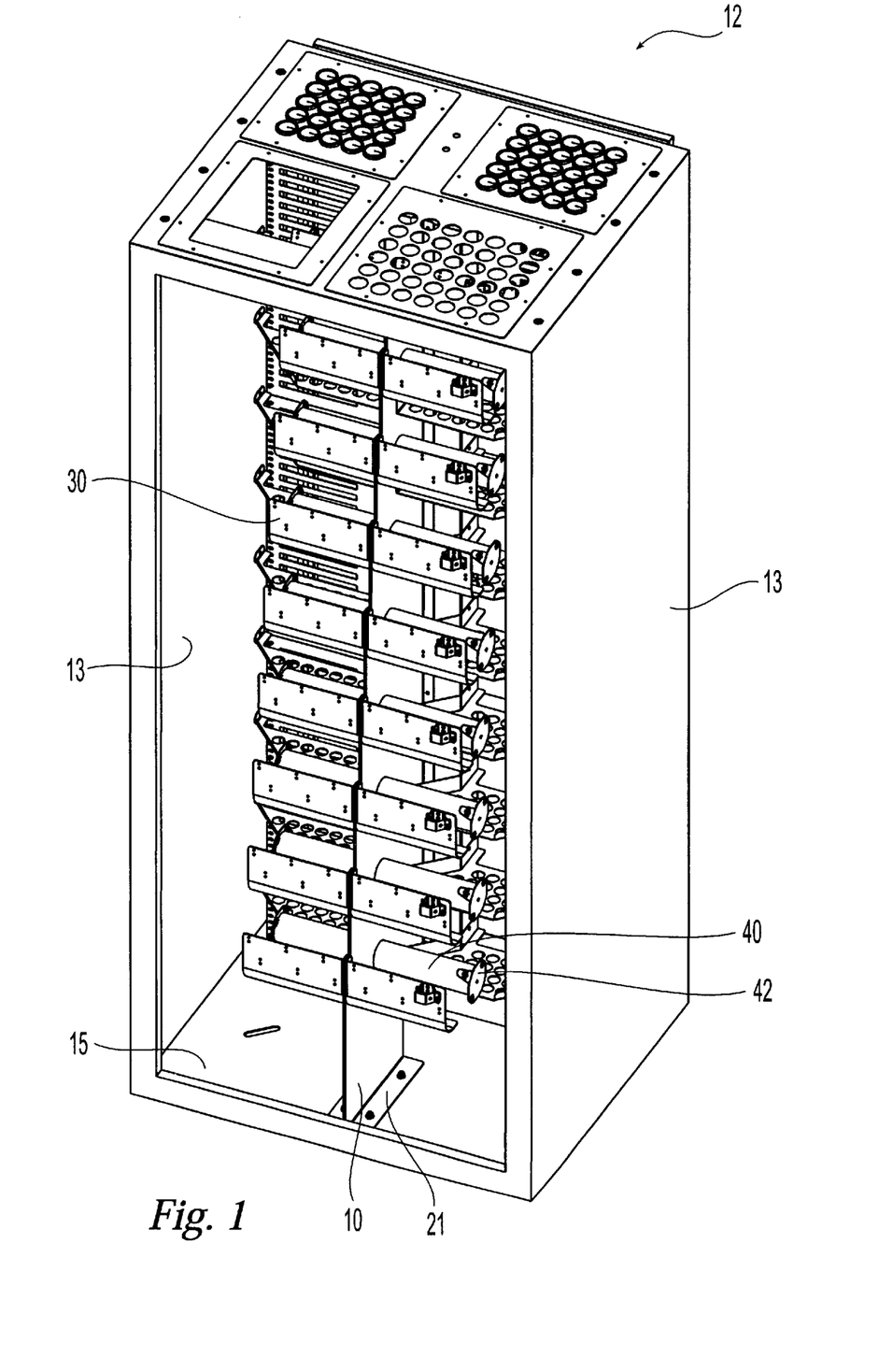
FIG. 1 is a perspective view of the rear of a conventional high-density cross-connect cabinet illustrating a preferred embodiment of a partition according to the invention for routing a plurality of fiber optic communications cables into the cabinet.

Referring now to the accompanying drawings, in which one or more preferred embodiments of the invention are illustrated, a preferred embodiment of a partition, indicated generally at 10, is shown in FIG. 1 mounted within an electrical cabinet 12. The electrical cabinet 12 may be any known structure for organizing and storing two or more electronic devices. In the example provided herein, the electrical cabinet 12 is a conventional high-density cross-connect cabinet for organizing and storing two or more patch panels (not shown). Each of the patch panels comprises a plurality of connectors at the rear for receiving mating connectors on the free ends of a plurality of fiber optic communications cables (not shown) in a known manner. Typically, the patch panels interconnect the fiber optic communications cables (also referred to herein as "communications cables" or "cables") from a telecommunications service provider with a plurality of subscriber communications cables located within a commercial or residential building having a large number of telecommunications service lines.

The cross-connect cabinet 12 may be made of any substantially rigid material and may have any desired shape and dimensions. However, the cross-connect cabinet 12 is usually constructed of thin sheet metal or hard plastic panels and is formed, as shown in FIG. 1, in the shape of a rectangular enclosure 14 having a height dimension greater than the width dimension and the depth dimension. The side walls 13 and the floor 15 of the cross-connect cabinet 12 are typically closed while the remainder of the cabinet 12 is left substantially open to provide access to the communications cables and the connectors on the rear of the patch panels. The patch panels are typically positioned at different levels within the cross-connect cabinet 12 to facilitate connection of the fiber optic communications cables to the connectors. In the example illustrated in FIG. 1, the cross-connect cabinet 12 comprises a total of eight levels, each level having a different patch panel associated therewith.

In many instances, the large number of fiber optic communications cables that are required to enter the cross-connect cabinet 12 and transition into the patch panels makes routing the cables to the proper connector on the appropriate patch panel at the corresponding level particularly difficult. For example, it is often exceedingly difficult and time consuming for a craftsman to trace, disconnect and re-route a communications cable from one patch panel connector to another patch panel connector on the same, or on a different, level of the cross-connect cabinet 12. It is also necessary in many instances to strain relieve the fiber optic communications cables entering the cross-connect cabinet 12 at different levels. In accordance with these and other objectives, the present invention provides a partition 10 that significantly improves access to the fiber optic communications cables and the cable connections, and in addition, provides strain relief to a plurality of cables at different levels of the cross-connect cabinet 12.

Figure 2:
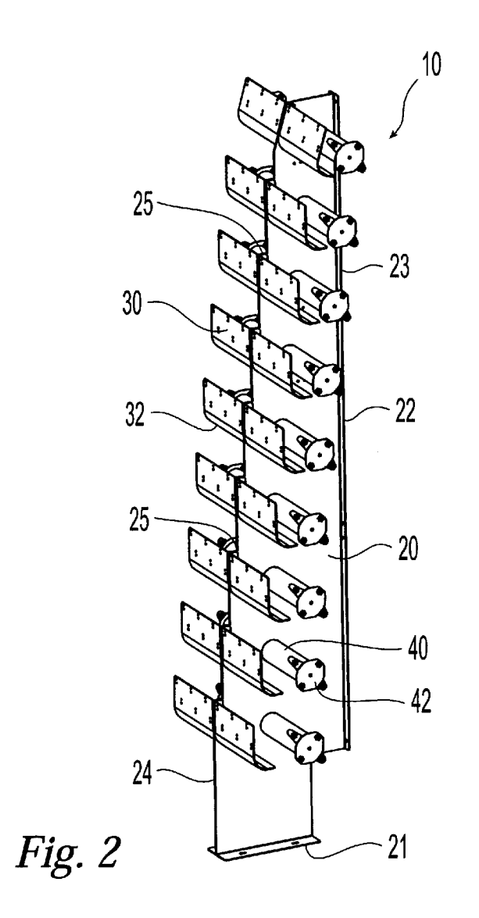
FIG. 2 is a rear perspective view of the partition of FIG. 1.
Figure 3:
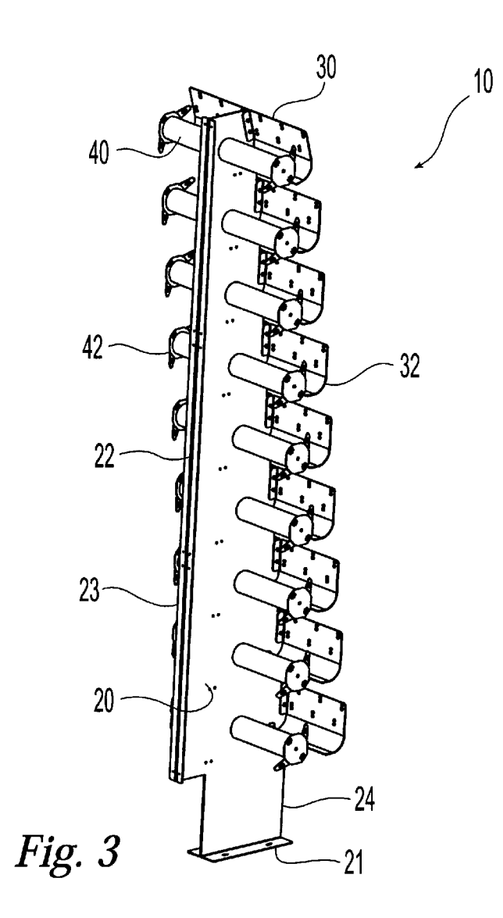
FIG. 3 is a front perspective view of the partition of FIG. 1.
Figure 4:
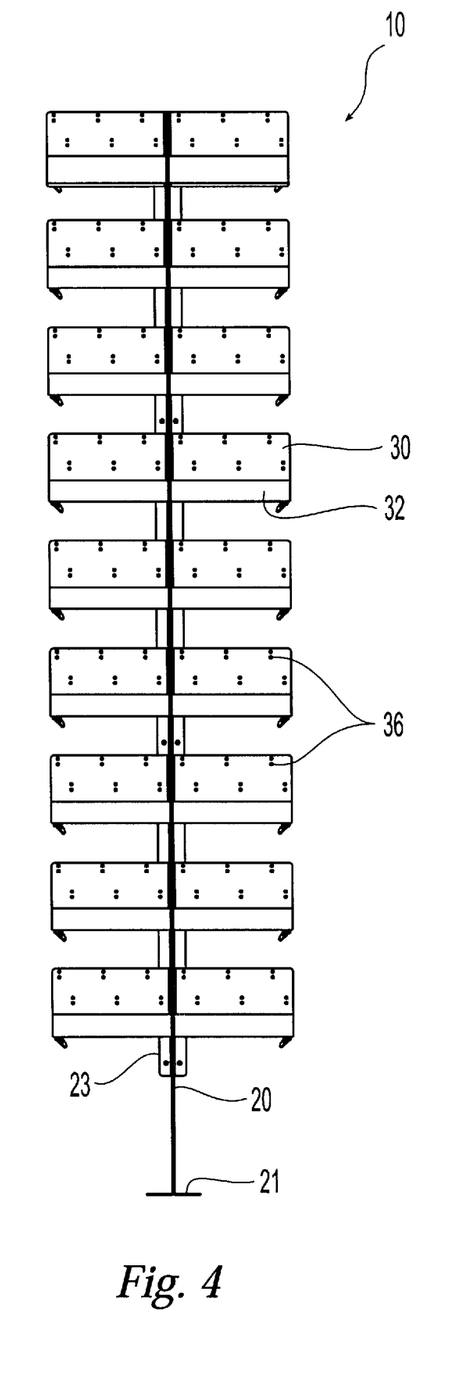
FIG. 4 is a rear elevation view of the partition of FIG. 1 showing the strain relief locations provided on the routing panels of the partition.
Figure 5:
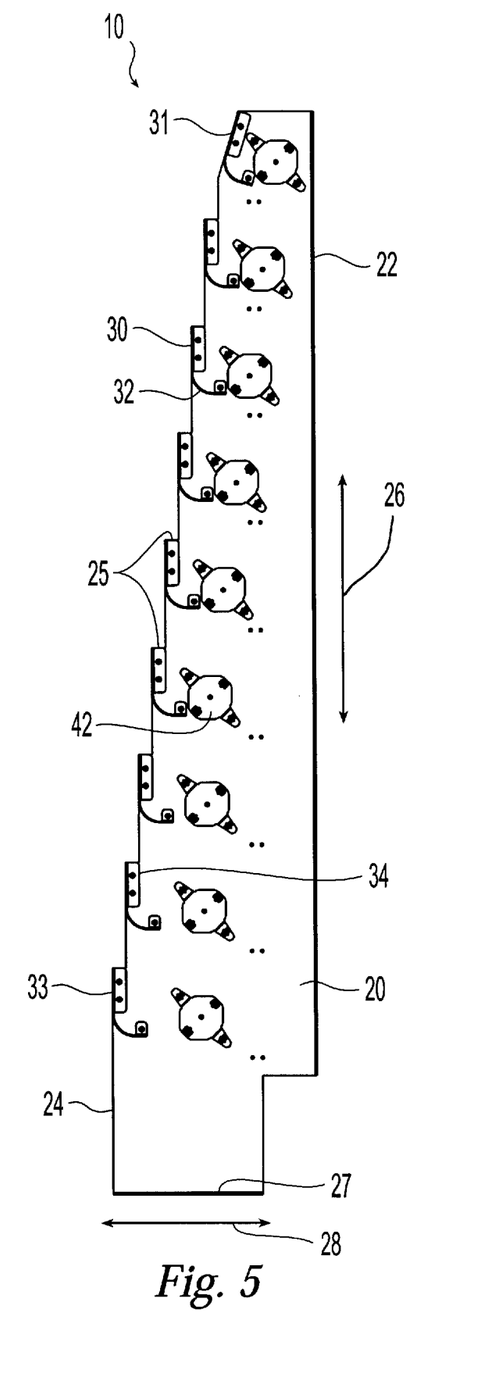
FIG. 5 is a side elevation view of the partition of FIG. 1 showing the longitudinally spaced apart and laterally spaced apart locations of the routing panels on the partition.

FIGS. 2–5 show the partition 10 removed from the cross-connect cabinet 12. Specifically, FIG. 2 is a perspective view of the partition 10 as viewed from the rear of the cross-connect cabinet 12. FIG. 3 is a perspective view of the partition 10 as viewed from the front of the cross-connect cabinet 12. FIG. 4 is an elevation view of the partition 10 as viewed from the rear of the cross-connect cabinet 12. FIG. 5 is a side elevation view of the partition 10. The partition 10 comprises a base plate 20 and a plurality of routing panels 30 depending outwardly from the base plate 20. The base plate 20 may be made of any substantially rigid material and may have any desired shape and dimensions. The base plate 20, however, is usually constructed of thin sheet metal or hard plastic that is generally planar and sized to fit within the cross-connect cabinet 12. For a purpose to be described hereinafter, the base plate 20 preferably comprises a pair of thin, mirror image, sheet metal plates positioned in back-to-back relation and secured together by spot welds.

The base plate 20 comprises a forward edge 22, a rearward edge 24, a first dimension, and a second dimension perpendicular to the first dimension. The first dimension defines a longitudinal direction, indicated by arrow 26 in FIG. 5. The second dimension defines a lateral direction, indicated by arrow 28 in FIG. 5. As shown and described herein, the longitudinal direction 26 is generally aligned with the height dimension of the cross-connect cabinet 12 and the lateral direction 28 is generally aligned with the depth dimension of the cross-connect cabinet 12. The forward edge 22 of the base plate 20 is preferably linear. The rearward edge 24 is angled relative to the forward edge 22 between about five and about thirty degrees and is preferably provided with a series of stepped portions 25 longitudinally spaced apart at increasing lateral distances from the forward edge 22, for a purpose to be described.

The base plate 20 is mounted within the cross-connect cabinet 12 with the forward edge 22 adjacent the patch panels and the rearward edge 24 adjacent the open rear of the cabinet 12. Preferably, the base plate 20 further comprises a first flange 21 extending in the lateral direction 28 between the forward edge 22 and the rearward edge 24. The first flange 21 is positioned adjacent the floor 15 of the cross-connect cabinet 12 and has one or more holes formed therethrough for receiving fasteners, for example rivets or sheet metal screws, to secure the partition 10 to the floor 15 of the cabinet 12. The base plate 20 may further comprise a second flange 23 extending in the longitudinal direction 26 adjacent the forward edge 22 of the base plate 20. The second flange 23 likewise has one or more holes formed therethrough for receiving fasteners, for example rivets or sheet metal screws, to secure the partition 10 to the patch panels or to mounting rails (not shown) provided on the interior of the cross-connect cabinet 12.

As previously mentioned, the base plate 20 preferably comprises a pair of thin, mirror image, sheet metal plates.

This construction is particularly advantageous because the lower edge 27 (FIG. 5) and the forward edge 22 of each of the sheet metal plates can be bent in the appropriate direction using conventional metal forming equipment through an angle of about ninety degrees. Thus, the first flange 21 and the second flange 23 are formed when the pair of mirror image, sheet metal plates are positioned in back-to-back relation and spot-welded together. The base plate 20 may then be mounted medially within the cross-connect cabinet 12, as shown, with routing panels 30 depending outwardly from both sides of the base plate 20. Alternatively, the base plate 20 may be comprised of a single thin, sheet metal plate with the lower edge 27 and the forward edge 22 of the plate bent in the appropriate direction through an angle of about ninety degrees. When constructed in this latter manner, the base plate 20 may be positioned within the cross-connect cabinet 12 adjacent one of the side walls 13 with routing panels 30 depending outwardly from only one side of the base plate 20 in the direction of the opposite side wall 13 of the cabinet 12.

In the preferred embodiment shown, the routing panels 30 of the partition 10 depend outwardly from the base plate 20 adjacent the rearward edge 24. However, the routing panels 30 may depend outwardly at any location on the base plate 20 as long as the routing panels 30 are positioned relative to one another in the manner described hereinafter. As shown, the routing panels 30 depend outwardly from the base plate 20 at an angle of about ninety degrees. However, the routing panels 30 may depend outwardly from the base plate 20 at any suitable angle. Furthermore, the routing panels 30 may depend outwardly at different angles relative to the base plate 20 to provide even greater access to the communications. cables and the connectors of a particular patch panel. Regardless, however, the routing panels 30 must depend outwardly from the base plate 20 at locations that are both longitudinally spaced apart and laterally spaced apart.

As best shown in FIG. 5, each routing panel 30 is spaced in the longitudinal direction 26 and in the lateral direction 28 from the adjacent routing panel 30. When moving in the longitudinal direction 26 from the uppermost routing panel 31 in the cross-connect cabinet 12 in the direction of the lowermost routing panel 33, each successive routing panel 30 is spaced from the previous routing panel 30 in the lateral direction 28 an increased distance from the forward edge 22. This progressive rearward movement of the lateral locations of the routing panels 30 on the base plate 20 is referred to herein as "graduated." The routing panels 30 are graduated laterally to provide improved access to the fiber optic communications cables, and ultimately, to the cable connections at the rear of the patch panels. Accordingly, the fiber optic communications cables entering the cross-connect cabinet 12 are more easily routed to the proper connector on the appropriate patch panel. Furthermore, the fiber optic communications cables can be more readily traced, disconnected, and re-routed to another connector on the same, or a different, level.

It is important to note that the invention is not intended to be limited to the preferred arrangement of the routing panels 30 shown herein. The routing panels 30 may be positioned at lateral locations on the base plate 20 in any desirable manner such that access to the fiber optic communications cables and the connectors at the rear of the patch panels is significantly improved. For example, the routing panels 30 may alternate in the lateral direction 28 towards the forward edge 22 and towards the rearward edge 24. In another example, the distance in the lateral direction 28 between the routing panel 30 and the forward edge 22 may increase from the uppermost routing panel 31 in the longitudinal direction 26 to a medial location on the base plate 20 and then decrease again symmetrically. The embodiment shown herein is considered to be the preferred embodiment because it provides a more significant improvement in the accessibility of the fiber optic communications cables and the cable connections at the patch panels. As shown, the rearward edge 24 of the base plate 20 comprises a plurality of distinct stepped portions 25, thereby creating a "stair step" configuration. In other embodiments, however, the rearward edge 24 may have a constant slope or may be curvilinear to maximize access to the fiber optic communications cables and the cable connections at the rear of the patch panels.

The routing panels 30 preferably comprise an arcuate portion 32 to transition the fiber optic communications cable smoothly from the rear of the cross-connect cabinet 12 to the patch panel without damaging the cable. In particular, the radius of the arcuate portion 32 is greater than the minimum bend radius of the fiber optic communications cable. The routing panels 30 further have one or more strain relief mounting points 36 for receiving a strain relief member 50 to permit a plurality of fiber optic communications cables entering the cross-connect cabinet 12 at the same location to be strain-relieved at different levels of the cabinet 12, as will be described. Finally, the routing panels 30 further comprise an attachment flange 34 for securing the routing panel 30 to the base plate 20. The routing panels 30 are preferably constructed in mirror image halves from thin sheet metal and the arcuate portions 32 and the flanges 34 are bent as required by conventional metal forming equipment, as previously described.

The partition 10 may further comprise a plurality of cable spools 40 affixed to and depending outwardly from the base plate 20 for storing a predetermined amount of slack of the fiber optic communications cable. Preferably, there is a one-to-one correlation between the number of cable spools 40 and the number of routing panels 30. In this manner, each routing panel 30 has a corresponding cable spool 40. The cable spool 40, like the arcuate portion 32 of routing panel 30, has a radius that is greater than the minimum bend radius of the fiber optic communications cable to avoid damaging the cable slack. Each cable spool 40 comprises a retaining flange 42 spaced apart from the base plate 20 for retaining the cable slack on the cable spool 40. As shown herein, the retaining flange 42 is spaced apart from the base plate 20 in a direction that is perpendicular to both the longitudinal direction 26 and the lateral direction 28. The radius of the retaining flange 42 is greater than the radius of the cable spool 40 so that the predetermined amount of slack fiber optic communications cable is securely retained on the cable spool 40.

Figure 6:
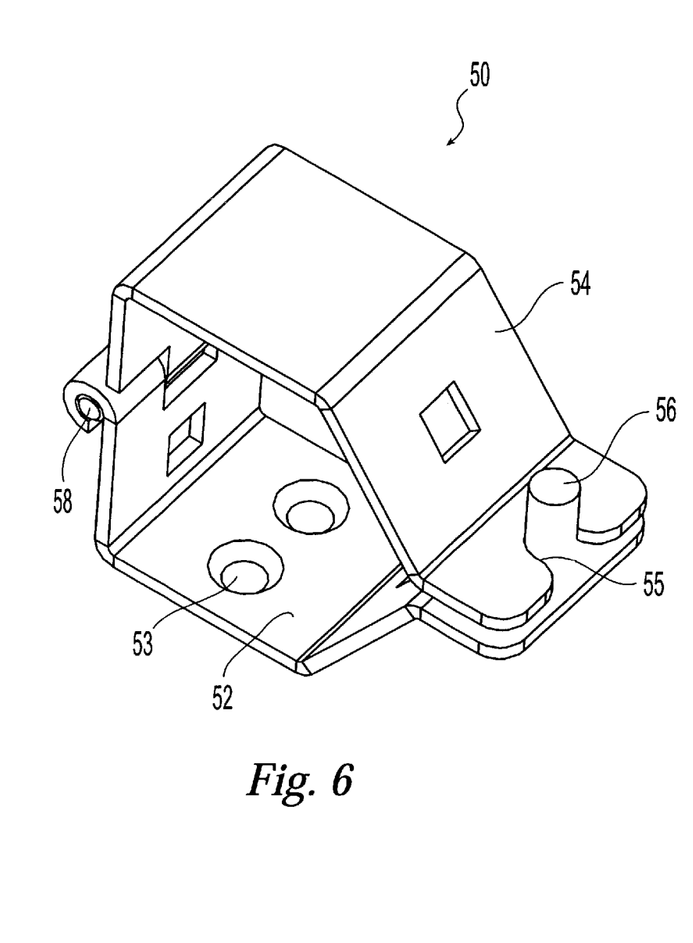
FIG. 6 is an enlarged perspective view of a preferred embodiment of a strain relief member for attachment to the routing panels of the partition at predetermined strain relief mounting points.
Figure 7:
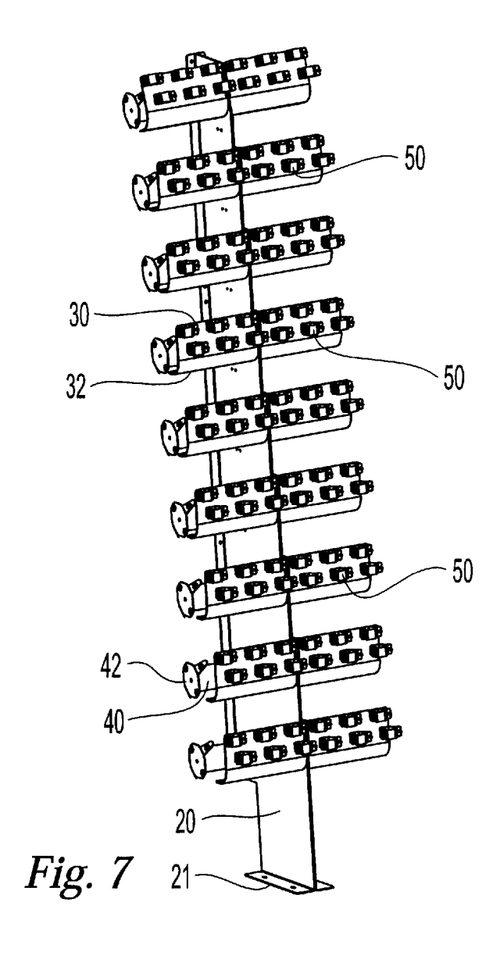
FIG. 7 is a perspective view of a plurality of the strain relief members of FIG. 6 attached to the routing panels of the partition at the predetermined strain relief mounting points.

The partition 10 preferably further comprises means for incrementally strain relieving a plurality of fiber optic communications cables entering the cross-connect cabinet 12 at the same location. In particular, the strain relieving means permits the plurality of fiber optic communications cables to be strain-relieved at different levels of the cross-connect cabinet 12 before the cables transition over the arcuate portion 32 of the routing panel 30 to the proper connector at the rear of the appropriate patch panel. FIG. 6 shows a preferred embodiment of an optional strain relief member, indicated generally at 50, according to the invention. FIG. 7 illustrates a plurality of the strain relief members 50 of FIG. 6 secured to the outer surfaces of the routing panels 30 of the partition 10. The strain relief member 50 may be any type of conventional means for strain relieving the fiber optic communication cables, such as the cable ties or Velcro® straps commonly utilized in communications hardware and equipment for routing electrical wiring and communications cables.

In the preferred embodiment of the strain relieving means shown in FIGS. 6 and 7, the strain relief member 50 is constructed of a thin, resilient metal or plastic material. The strain relief member 50 comprises a generally u-shaped base 52 for receiving the fiber optic communications cable therein and a cover 54 that is hingedly attached to the base 52. The base 52 has one or more holes 53 formed therethrough for receiving conventional fasteners, such as rivets or screws, to mount the base 52 on the appropriate routing panel 30 at one of the strain relief mounting points 36 (FIG. 4). The cover 54 is hingedly attached to the base 52 such that the cover 54 may be alternately opened to permit the fiber optic communications cable to be positioned within the base 52 and then closed to retain the fiber optic communications cable within the base 52. The base 52 has an upwardly extending post 56 that is frictionally engaged by a complimentary notch 55 formed in the cover 54. The cover 54 may be opened, and the fiber optic communications cable thereby inserted or removed, by prying the cover 54 upwardly from the base 52 so that the cover 54 rotates about the hinge 58 from the closed position to the open position.

As is now apparent, the invention provides an improved partition for routing a plurality of fiber optic communications cables into a high-density cross-connect cabinet. The partition provides improved access to the communications cables and the cable connections. The partition further permits a plurality of fiber optic communications cables entering the cross-connect cabinet at the same location to be strain-relieved at different levels of the cabinet. While the invention has been disclosed by the preferred embodiments described and illustrated herein, it will be readily apparent to one of ordinary skill in the art that the invention is susceptible to various modifications and alterations without departing from the intended spirit and scope of the invention. Obviously, many alternative embodiments are conceivable that are well within the abilities of a person of ordinary skill in the art. Accordingly, it is intended that the invention be afforded the broadest possible scope consistent with the above description, the accompanying drawings, and the appended claims, so as to encompass any and all such alternative embodiments.

That which is claimed is:

1. A partition for routing a communications cable into an electrical cabinet, the partition comprising:
   a base plate, the base plate having a forward edge, a rearward edge, a first dimension defining a longitudinal direction, and a second dimension perpendicular to the first dimension and defining a lateral direction;
   at least two routing panels depending outwardly from the base plate, each of the routing panels comprising an arcuate portion defining a convex surface for receiving a portion of the cable thereon; and
   at least one generally cylindrical cable spool depending outwardly from the base plate for receiving a portion of the cable thereon;
   wherein the routing panels depend outwardly from the base plate at longitudinally spaced apart and laterally spaced apart locations.

2. A partition according to claim 1 wherein each of the routing panels depends outwardly from the base plate adjacent the rearward edge.

3. A partition according to claim 1 wherein the rearward edge of the base plate is angled relative to the forward edge of the base plate.

4. A partition according to claim 3 wherein the rearward edge of the base plate is angled relative to the forward edge of the base plate between about five degrees and about thirty degrees.

5. A partition according to claim 1 wherein the cable spool comprises a generally cylindrical retaining flange spaced apart from the base plate and having a radius greater than the radius of the cable spool.

6. A partition according to claim 1 wherein at least one of the routing panels comprises means for strain relieving the cable.

7. A partition according to claim 1 wherein the base plate further comprises a lower edge and a laterally extending flange adjacent the lower edge for securing the partition to the electrical cabinet.

8. A partition according to claim 1 wherein the base plate further comprises a longitudinally extending flange adjacent the forward edge for securing the partition to the electrical cabinet.

9. A partition for routing a communications cable, the partition comprising:
   a generally planar base plate, the base plate having a forward edge, a rearward edge, a first end, a second end, a first dimension defining a longitudinal direction, and a second dimension perpendicular to the first dimension and defining a lateral direction; and
   at least two routing panels depending outwardly from the base plate adjacent the rearward edge, at least one of the routing panels comprising an arcuate portion for receiving the cable thereon;
   wherein the routing panels depend outwardly from the base plate at longitudinally spaced apart and laterally spaced apart locations and wherein the rearward edge of the base plate comprises a series of stepped portions longitudinally spaced apart at increasing lateral distances from the forward edge of the base plate.

10. A partition for routing a communications cable, the partition comprising:
    a base plate, the base plate having a forward edge, a rearward edge, a first end, a second end, a first dimension defining a longitudinal direction, and a second dimension perpendicular to the first dimension and defining a lateral direction;
    at least two routing panels depending outwardly from the base plate adjacent the rearward edge, at least one of the routing panels comprising an arcuate portion for receiving the cable thereon; and
    at least one generally cylindrical cable spool for receiving a portion of the cable thereon, the cable spool depending outwardly from the base plate, the cable spool comprising a generally cylindrical retaining flange spaced apart from the base plate and having a diameter greater than the diameter of the cable spool;
    wherein the routing panels depend outwardly from the base plate at longitudinally spaced apart and laterally spaced apart locations.

11. A partition for routing a communications cable, the partition comprising:
    a base plate, the base plate having a forward edge, a rearward edge, a first end, a second end, a first dimension defining a longitudinal direction, and a second dimension perpendicular to the first dimension and defining a lateral direction; and
    at least two routing panels depending outwardly from the base plate adjacent the rearward edge, at least one of the routing panels comprising an arcuate portion for receiving the cable thereon;

wherein the routing panels depend outwardly from the base plate at longitudinally spaced apart and laterally spaced apart locations and wherein at least one of the routing panels comprises a strain relief member for receiving the cable therein, the strain relief member comprising a base and a cover hingedly attached to the base for movement between an open position and a closed position.

12. A partition according to claim 11 wherein the rearward edge of the base plate is angled relative to the forward edge of the base plate.

13. A partition for routing a communications cable, the partition comprising;
- a base plate, the base plate having a forward edge, a rearward edge, a first dimension defining a longitudinal direction, and a second dimension perpendicular to the first dimension and defining a lateral direction, the rearward edge being angled relative to the forward edge between about five degrees and about thirty degrees; and
- at least two routing panels depending outwardly from the base plate, each of the routing panels comprising an arcuate portion defining a convex surface for receiving a portion of the cable thereon;
- wherein each of the routing panels depends outwardly from the base plate adjacent the rearward edge at longitudinally spaced apart and laterally spaced apart locations.

14. A partition according to claim 13 wherein at least one of the routing panels comprises means for strain relieving the cable.

15. A partition for routing a communications cable, the partition comprising:
- a base plate, the base plate having a forward edge, a rearward edge, a first dimension defining a longitudinal direction, and a second dimension perpendicular to the first dimension and defining a lateral direction, the rearward edge comprising a series of stepped portions longitudinally spaced apart at increasing lateral distances from the forward edge; and
- at least two routing panels depending outwardly from the base plate, each of the routing panels comprising an arcuate portion defining a convex surface for receiving a portion of the cable thereon,
- wherein the routing panels depend outwardly from the base plate at longitudinally spaced apart and laterally spaced apart locations.

16. A partition according to claim 15 wherein each of the routing panels depends outwardly from the base plate adjacent the rear edge.

17. A partition according to claim 15 wherein the rearward edge of the base plate is angled relative to the forward edge of the base plate.

18. A partition according to claim 15 wherein at least one of the routing panels comprises means for strain relieving the cable.

19. A partition for routing a communications cable, the partition comprising:
- a base plate, the base plate having a forward edge, a rearward edge, a first dimension defining a longitudinal direction, and a second dimension perpendicular to the first dimension and defining a lateral direction;
- at least two routing panels depending outwardly from the base plate, each of the routing panels comprising an arcuate portion defining a convex surface for receiving a portion of the cable thereon;
- wherein the routing panels depend outwardly from the base plate at longitudinally spaced apart and laterally spaced apart locations and wherein at least one of the routing panels comprises a strain relief member for receiving the cable therein, the strain relief member comprising a base and a cover hingedly attached to the base for movement between an open position and a closed position.

20. A partition according to claim 19 herein each of the routing panels depends outwardly from the base plate adjacent the rear edge.

21. A partition according to claim 19 wherein the rearward edge of the base plate is angled relative to the forward edge of the base plate.

* * * * *

UNITED STATES PATENT AND TRADEMARK OFFICE
CERTIFICATE OF CORRECTION

| | | |
|---|---|---|
| PATENT NO. | : 6,464,310 B1 | |
| DATED | : October 15, 2002 | |
| INVENTOR(S) | : Jennifer D. Burns, Carrie L. Gordon and Monique L. Cote | |

It is certified that error appears in the above-identified patent and that said Letters Patent is hereby corrected as shown below:

<u>Title page,</u>
Item [57], ABSTRACT,
Lines 14-16, after "Each routing panel includes an arcuate portion for transitioning the fiber optic communication cables into the cross-connect cabinet", insert -- while maintaining the minimum bend radius of the cable. --

Signed and Sealed this

Twenty-first Day of January, 2003

JAMES E. ROGAN
*Director of the United States Patent and Trademark Office*